UNITED STATES PATENT OFFICE.

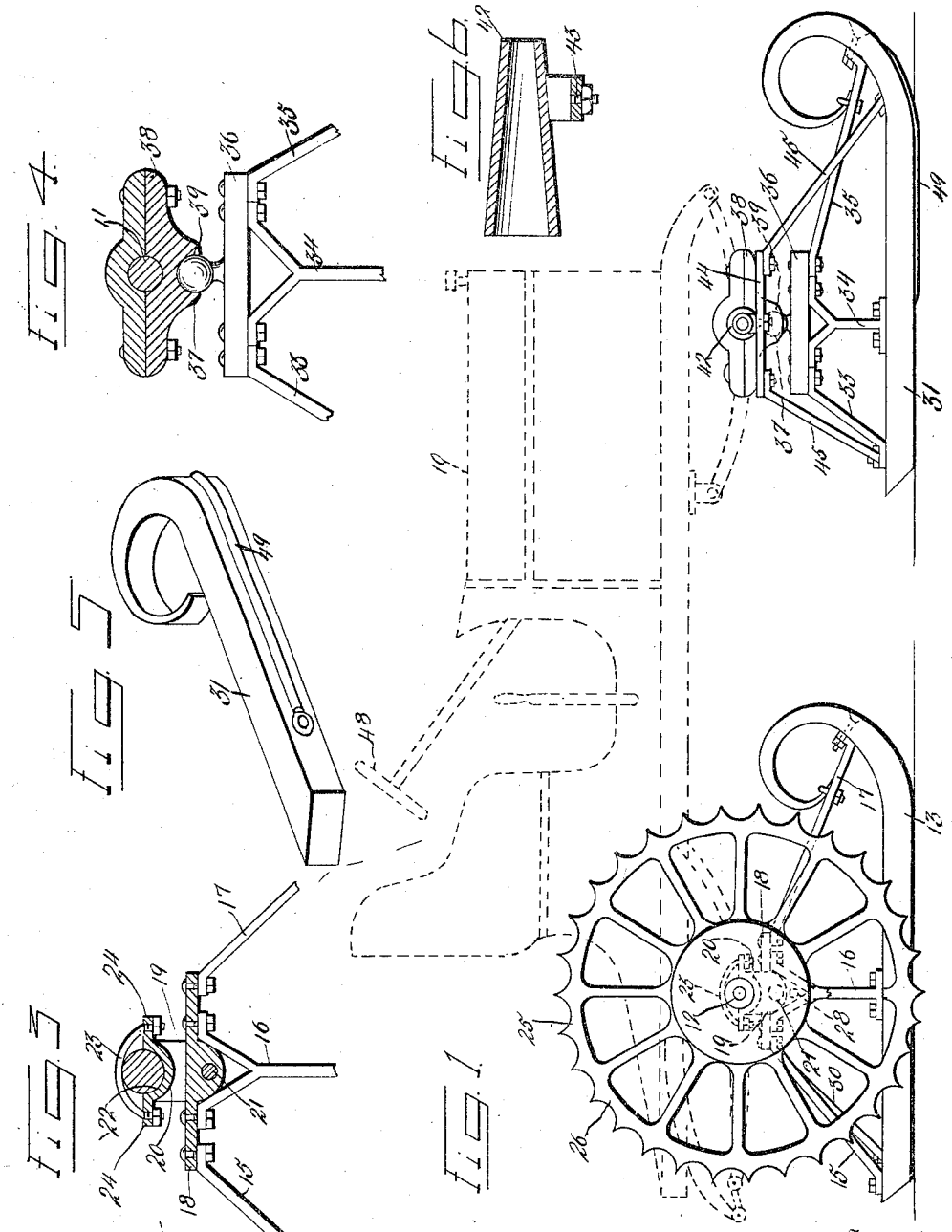

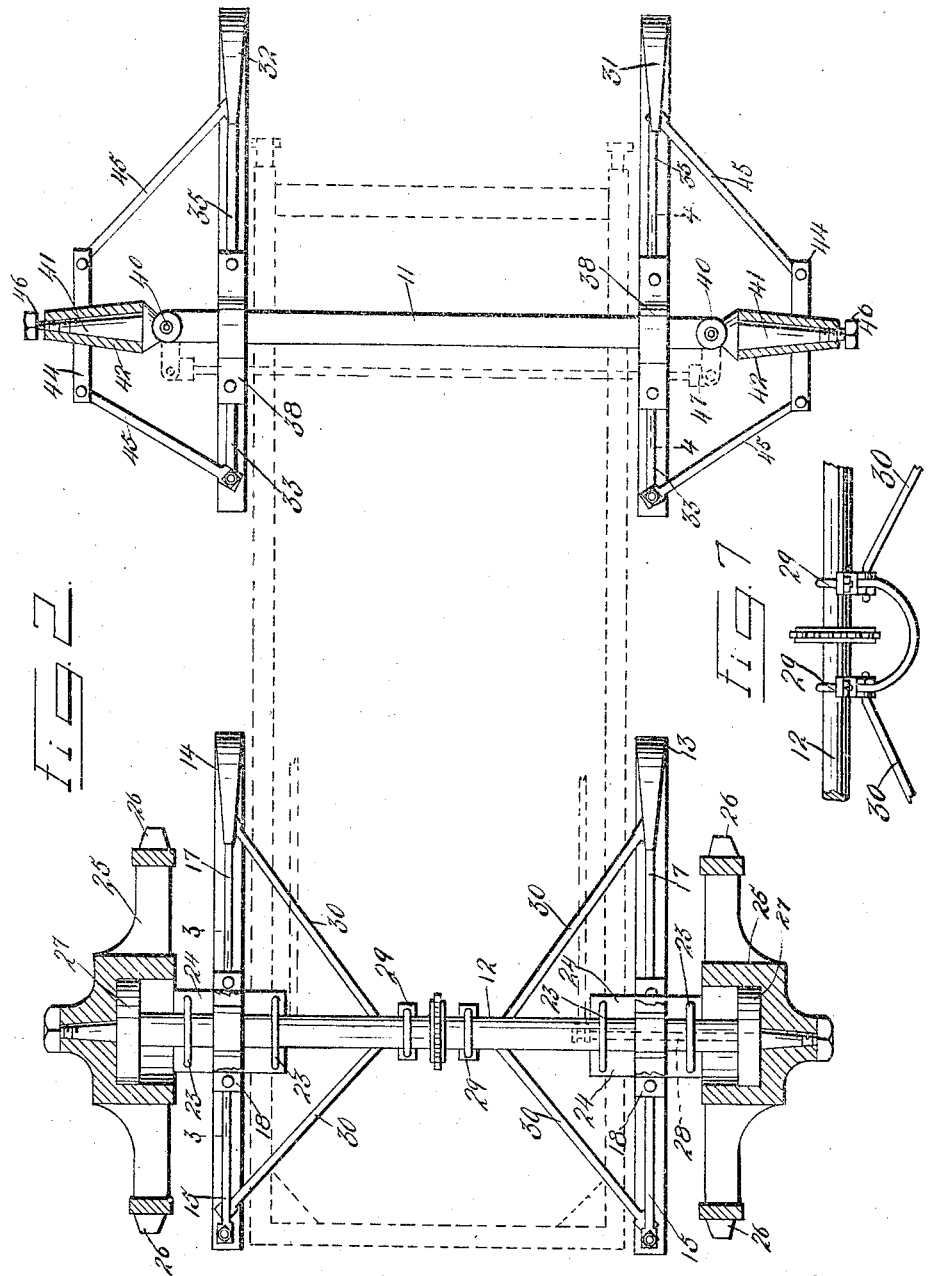

HANS GUTTORMSON AND HILDING HAST, OF HOPE, NORTH DAKOTA, ASSIGNORS OF ONE-THIRD TO HUGO GUNKEL, OF HOPE, NORTH DAKOTA.

MOTOR-SLEIGH.

987,573.

Specification of Letters Patent. Patented Mar. 21, 1911.

Application filed November 15, 1910. Serial No. 592,522.

*To all whom it may concern:*

Be it known that we, HANS GUTTORMSON and HILDING HAST, citizens of the United States, residing at Hope, in the county of Steele, State of North Dakota, have invented certain new and useful Improvements in Motor-Sleighs; and we do hereby declare the following to be a full, clear, and exact description of the invention, such as will enable others skilled in the art to which it appertains to make and use the same.

This invention relates to motor sleighs.

The object of the invention resides in the construction of a motor sleigh which includes front and rear bobs and to which latter the body and axles of an ordinary automobile can be quickly and easily connected without in any manner altering the parts of the automobile body.

A further object of the invention resides in so constructing the front bob of the sleigh that the steering apparatus of the automobile can be easily and quickly connected therewith so as to effect the proper steering of the sleigh through the medium of the automobile steering apparatus.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of a motor sleigh constructed in accordance with the invention, the body thereof being shown in dotted lines; Fig. 2, a plan view of what is shown in Fig. 1, with the body removed and certain portions in section; Fig. 3, a section on the line 3—3 of Fig. 2; Fig. 4, a section on the line 4—4 of Fig. 2; Fig. 5, a detail perspective view of one of the runners of the front bob; Fig. 6, a section through the sleeve connection which receives the pivoted ends of the front axle of the body; and, Fig. 7, a rear elevation of a fragment of the rear axle of the body.

Referring to the drawings, 10 indicates the body of the sleigh which is constructed similar to the ordinary automobile body and carries front and rear axles 11 and 12 respectively.

The rear bob of the sleigh comprises the runners 13 and 14, from each of which rises a vertical supporting frame formed of members 15, 16 and 17, which are connected together at their upper ends by means of a plate 18. Embracing each of the plates 18 is a pair of depending spaced ears 19 of a bearing 20, and a pin 21 pivotally connects this bearing to the plates 18. The upper side of the bearing 20 is provided with a longitudinal groove 22, in which the adjacent end of the axle 12 is rotatably seated. The axle 12 is held against displacement from the groove 22 of each bearing 20 by means of U shaped clips 23 which have their free ends detachably connected with flanges 24 on each bearing. Mounted on each end of the axle 12 exteriorly of the bearings 20 is a tractor wheel 25 provided with the usual peripheral ice engaging prongs 26. These wheels 25 are constructed like the usual automobile wheel and provided with a hub brake 27 operated by a thrust rod 28 through the medium of the usual connections leading to the automobile body. By this construction, it will be apparent that when the motor carried by the automobile body is operated, the tractor wheel 25 will be rotated to propel the sleigh and that the runners 13 and 14 by reason of their pivotal connection with the bearing 20 will be adapted for independent longitudinal movement so as to adapt themselves readily to the varying contours of the snow and ice.

Disposed centrally of the axle 12 is a clip 29, to which brace rods 30 extending from each of the runners 13 and 14 are connected; said brace rods serving to hold the runners against movement toward and away from each other.

The forward bob of the sleigh is formed of runners 31 and 32, from each of which rises a vertical supporting frame formed of the members 33, 34 and 35, which are connected together at their upper ends by a plate 36. This plate 36 carries on its upper face a ball 37 for a purpose that will presently appear. Fixed on the axle 10 against each end are couplings 38, which have formed in their lower sides sockets 39 to receive the ball 37 carried by a respective plate 36, whereby a ball and socket connection is established between the axle 11 and each of the runners 31 and 32. Such a connection, as will be apparent, allows the runners 31 and 32 to be moved for the purpose of steering and also for the purpose of allowing the runners to conform gently to variations in contour in the surface of the snow and ice over which the sleigh is traveling.

The axle 11 is provided at each end with corresponding pivoted terminals having the usual outwardly tapering wheel bearings 41. Mounted upon each bearing 41 for rotation and limited longitudinal movement is a sleeve 42, which carries a depending pin 43, upon which is pivotally mounted a plate 44. Each of the runners 31 and 32 is connected to a respective plate 44 by means of brace rods 45. The sleeve 42 is held against displacement from the bearing 41 by means of a nut 46 threaded on the outer end of said bearing.

The pivoted terminals 40 are operated by the usual steering gear 47, which includes the steering wheel 48 shown in Fig. 1. The movement of the pivoted terminals 40 under the influence of the steering gear will by reason of their connection with the runners 31 and 32 cause said runners to be shifted for the purpose of steering the sleigh. The forward runners 31 and 32 are each provided on their under side with a longitudinal rib 49 to prevent skidding of the sleigh when steering.

What is claimed is:—

1. In a motor sleigh, the combination with a body having front and rear axles, of a rear bob comprising spaced runners, a frame rising from each runner, a bearing pivoted to each frame in which opposite ends of the rear axle are rotatably mounted, each of said bearings comprising a member provided with a longitudinal groove in its upper side to receive the axle, means for rotatably securing the axle in said groove, a pair of depending ears on the lower side of said member embracing the upper portion of a respective frame, a pivot pin passing through said ears and through the upper portion of the frame, tractor wheels carried by the rear axle, and a front bob supporting the forward axle of the body.

2. In a motor sleigh, the combination with a body having front and rear axles, the former of which is provided with pivoted terminals, a front bob comprising spaced runners, a frame rising from each runner, a ball on the top of each frame, a coupling on each end of the axle provided with a socket in which the ball carried by a respective frame is disposed, a sleeve mounted on each pivoted terminal for rotative and longitudinal movement, a stud depending from said sleeve, a bar pivoted on said stud, rigid connections between each end of said bar and the adjacent runner of the front bob, a rear bob supporting the rear axle of the body, and tractor wheels on each end of the rear axle.

In testimony whereof, we affix our signatures in presence of two witnesses.

HANS GUTTORMSON.
HILDING HAST.

Witnesses:
C. S. SHIPPY,
E. D. WASHBURN.